United States Patent

[11] 3,550,947

| | | | |
|---|---|---|---|
| [72] | Inventor | Leonard W. Kallies<br>395 4th St., Pontiac, Mich. 48055 | |
| [21] | Appl. No. | 806,905 | |
| [22] | Filed | Mar. 13, 1969 | |
| [45] | Patented | Dec. 29, 1970 | |

[54] BOAT, TRAILER AND CAMPER COMBINATION
2 Claims, 5 Drawing Figs.

[52] U.S. Cl........................................ 296/23, 214/515
[51] Int. Cl........................................ P60p 3/32
[50] Field of Search............................ 296/23, 23B; 214/515

[56] References Cited
UNITED STATES PATENTS

| 3,486,786 | 12/1969 | Howarth...................... | 296/23B |
| 3,338,554 | 8/1967 | Gostumski................... | 214/515 |

Primary Examiner—Philip Goodman
Attorney—Price, Heneveld, Huizenga & Cooper

ABSTRACT: A sportman's boat trailer and telescopic camper assembly, the boat being suspended beneath an elevated support deck and the camper being retained on and hoistable off the support deck for expansion thereof.

INVENTOR.
LEONARD W. KALLIES

BOAT, TRAILER AND CAMPER COMBINATION

BACKGROUND OF THE INVENTION

This invention relates to a camper-trailer assembly, and more particularly to a unique boat trailer and telescopic camper assembly.

In these days of extra leisure, boat trailers and camper trailers travel the highways and side roads in thousands, particularly in vacation states with abundant available water. Since vacationers naturally wish to take their boat equipment and their camper units at the same time on their journey to the water's edge, the boats are too frequently strapped to the side or top of the camper or the top of the auto in precarious fashion. This not only constitutes a safety hazard in driving, but requires considerable effort and time to hoist the boat up, take it down again, and drag it into and out of the water. As boat enthusiasts pass through the inevitable sequence of larger and larger boats and motors, these cumbersome tasks become almost an impossibility. Consequently the average camper boater longs for a boat trailer camper assembly enabling both the boat and camper to be loaded without excessive strain, on one trailer, enabling the combination to be hauled safely at relatively high speeds, enabling quick, easy separation of the camper and use thereof in a manner to provide maximum living space, and enabling even heavy boat and motor units to be easily lowered directly into the water and just as readily hoisted out of the water again.

SUMMARY OF THE INVENTION

It is the main object of this invention to provide a unique assembly capable of fulfilling these functions. As a boat trailer, it allows direct lowering of the boat down into the water and raising it up out of the water. Even relatively large heavy boats may be so handled. Further, the assembly has a telescopic camper unit compactly carried with respect to the boat, and readily removable from the trailer for lowering into an expanded condition. The assembly is compact. It hauls readily and safely.

The boat trailer-camper assembly has a telescopically expandable camper interfitted with and supported on an elevated support deck on the trailer, the camper having elevator means for disengaging it from the trailer, and the trailer having an open bottom beneath said platform for directly lowering the boat down into the water.

DESCRIPTION OF THE PREFERRED EMBODIMENT

Figure 1:
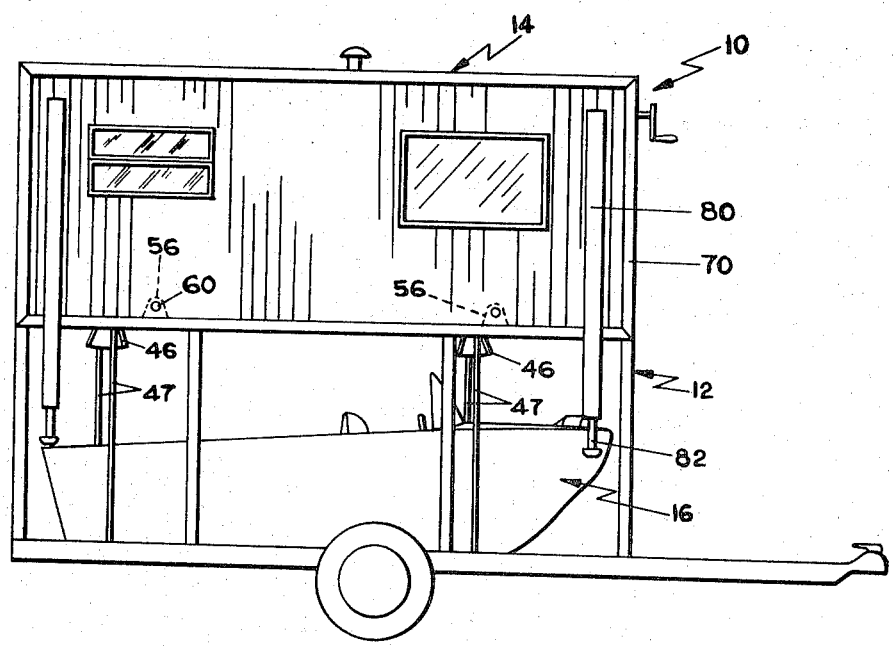
FIG. 1 is a side elevational view of the novel assembly.

The assembly 10 includes a trailer subassembly 12, and a camper subassembly 14. Mounted on trailer subassembly 12 is a boat 16.

Trailer subassembly 12 has a framework which includes a pair of generally parallel, front to rear, laterally spaced, side support beams 20 and 20' connected at their front ends by a cross beam 22 and mounted by suitable spring and bearing means on a pair of wheel subassemblies 24 and 24'. This framework also includes an elevated platform subassembly composed of a pair of front to rear, generally parallel, laterally spaced, beams 26 and 26' interconnected by suitable transverse member 28, 30, 32 and 34. This platform is generally parallel to the bottom beams 20 and 20' and is secured in elevated relationship with respect thereto by a plurality of upright pillars or posts 36 adjacent the front end and adjacent the rear end of the trailer framework. A tongue subassembly and hitch unit 40 protrude forwardly from the trailer unit for hauling.

Mounted on this elevated platform of the trailer is a boat hoist means, specifically shown as an elongated, centrally positioned, front to rear shaft 42 rotationally mounted on bearings 44. This rotational shaft has double pulleys 46 adjacent the front and rear ends, and crank means 48 or other suitable shaft rotation means, manual or powered, to enable a boat to be hoisted and lowered into and out of the confining space beneath the elevated platform by shortening and lengthening of the hoist ropes. The space beneath the platform is generally an open bottom through which the boat can be hoisted or lowered. This bottom may be temporarily closed beneath a boat by a pair of underlying pivotal safety supports 50 having one end hinged (as by hinges 52) to one of beams 20 and 20' (here 20), the other end being capable of engaging the opposite beam e.g. 20' when pivoted to the transverse position.

Figure 2:
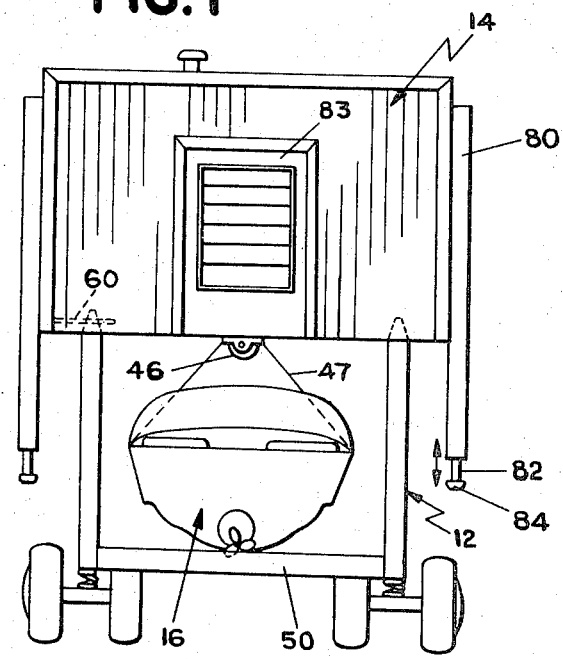
FIG. 2 is a rear elevational view of the assembly.

The trailer also includes interfitting means for the camper subassembly 14. This may take the form of a plurality of frustoconical or other suitably shaped guide and retention elements 56 which can be mounted atop the elevated platform, as on members 26 and 26'. These interfit with correspondingly shaped recesses in the base of camper subassembly 14, and may be secured through this interfit as by keeper pins 60 (FIGS. 1 and 2) inserted through the side of the unit, or any other suitable equivalent.

Figure 3:
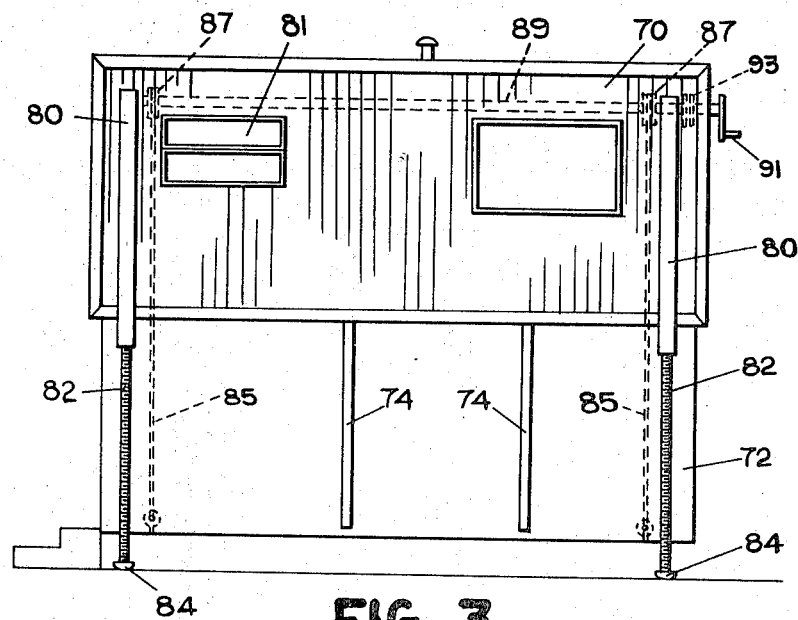
FIG. 3 is a side elevational view of the camper unit of the assembly, shown removed from the trailer portion of the assembly.
Figure 4:
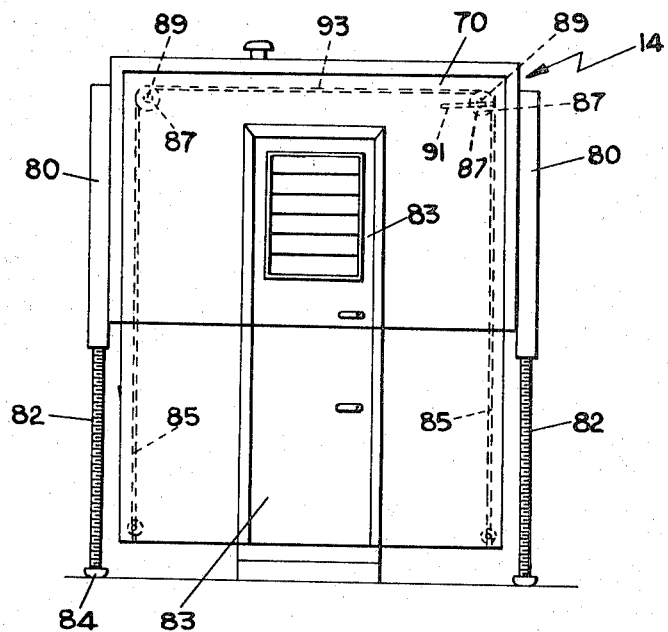
FIG. 4 is a rear elevational view of the camper unit in FIG. 3.
Figure 5:
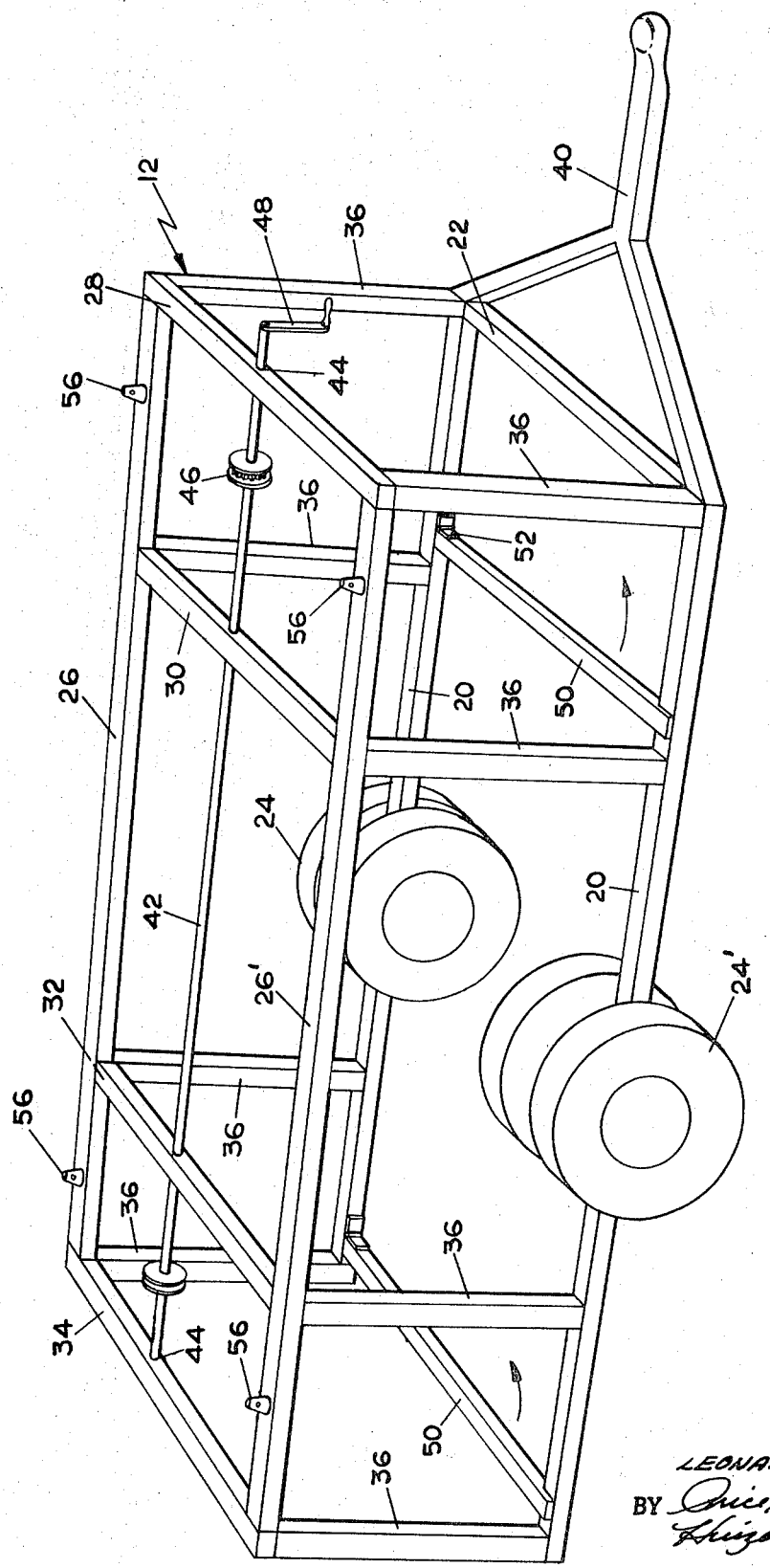
FIG. 5 is a perspective view of the trailer portion of the assembly.

Camper unit 14 includes an outer upper member 70 having peripheral walls and a top, and an inner lower member 72 having peripheral walls and a bottom. Member 72 is capable of telescopically interfitting inside member 70 or being lowered down from it as illustrated in FIGS. 3 and 4. This camping unit is therefore a telescopically expandable-contractible assembly. It expands oppositely to those conventionally known, i.e. the lower part expands downwardly rather than the upper outer part expanding upwardly. The two portions 70 and 72 include interfitting guide means such as protrusions and receiving slots 74 as well as windows 81 and doors 83. It has suitable expansion and contraction means such as cables 85 around pulleys 87 on shafts 89 operated by crank 91, and interconnected by cable 93, or an equivalent mechanism. The unit is expandable after removal from the trailer subassembly.

For removal from the trailer, the camper unit includes a pair of vertically extensible, telescopically expandable elevator units, mounted to the outside walls of outer upper member 70. Preferably there are two on each lateral side of the camper. The outer and inner elements 80 and 82 of each of these jack units are threadably interengaged so that, with forced rotation of elements 82, the ground engaging pads 84 on the lower ends thereof will be lowered to engage the ground. Further rotation will cause elevation of the camper unit to disengage elements 56 from their receiving openings on the bottom of the camper. Once this disengagement has been effected, the trailer and boat can be pulled from beneath the camper unit. Then the inner lower portion 72 of the camper unit is lowered for living purposes, while the boat and boat trailer can be taken to the water as desired.

The boat trailer is uniquely constructed such that, when it is backed into the water, the boat can be lowered directly vertically down out of the trailer rather than having to slide it forwardly, rearwardly, sidewardly, or the like. This is done merely by pivoting the underlying safety supports 50 on hinges 52 to cause them to lie flush against beam 20, and then rotating shaft 42 and pulleys 46 to unwind the ropes or other suitable tension supports 47 to lower the boat into the water.

Hoisting of the boat back into the confining space beneath the elevated platform of the trailer can be just as readily accomplished by backing the trailer over the boat, hooking the ropes onto or around it, and winding the ropes onto the pulleys. Reloading of the camper unit is also readily done by hoisting the inner lower section 72 inside the upper outer section 70, backing the trailer beneath the structure, and then collapsing jack units 80 to settle the camper down upon the trailer platform and its guides for securement.

It is conceivable that those skilled in the art will observe other advantages not specifically noted herein. It is also conceivable that minor structural changes may be made to suit a particular type of fabrication without departing from the concept presented.

I claim:

1. A sportsman's boat trailer and telescopically expandable camper assembly comprising: a wheel mounted trailer frame having an elevated support deck mounted on spaced side supports such that said deck and side supports together define an open bottom, boat-receiving and confining space; boat elevating mechanism mounted to said deck to hoist and lower a boat into and out of said confining space through said open bottom; retention means on said support deck to interfit with a telescopically expandable camper unit; a contracted, telescopically expandable camper unit support on said support deck and interfitted with said retention means; said camper unit having an outer upper portion and an inner lower portion; ground engageable, vertically extensible elevator means on said outer upper portion capable of elevating said camper unit off said support deck for movement of said wheeled trailer frame from thereunder; and said inner lower portion being telescopically extensible down from said upper portion when said trailer frame is so removed.

2. The assembly in claim 1 including safety supports shiftable from a first position out of said open bottom to a second position across said open bottom to underlie a boat in said confining space.